United States Patent [19]

Wilkinson

[11] Patent Number: 4,542,683

[45] Date of Patent: Sep. 24, 1985

[54] BREWING APPARATUS

[75] Inventor: Noel R. Wilkinson, Burton-upon-Trent, England

[73] Assignee: Robert Morton DG Limited, England

[21] Appl. No.: 555,943

[22] Filed: Nov. 29, 1983

[30] Foreign Application Priority Data

Feb. 3, 1983 [GB] United Kingdom ............... 8302974
Dec. 7, 1983 [GB] United Kingdom ............... 8234876

[51] Int. Cl.³ .............................................. C12G 3/04
[52] U.S. Cl. .................................. 99/277.2; 426/16; 426/29; 435/93; 435/305
[58] Field of Search .............. 99/275, 276, 277, 277.1, 99/277.2, 278, 348; 366/165, 144, 147, 149; 426/16, 29; 435/93, 302, 305, 307, 308

[56] References Cited

U.S. PATENT DOCUMENTS

| | | | |
|---|---|---|---|
| 2,948,617 | 8/1960 | Paine | 426/16 |
| 3,207,606 | 9/1965 | Williams | 99/276 |
| 3,656,974 | 4/1972 | Mihalyi | 99/348 |
| 3,739,710 | 1/1973 | Costa | 99/348 |
| 3,782,551 | 1/1974 | Soldan | 99/278 |
| 3,994,480 | 11/1976 | Fothergill | 366/165 |
| 4,009,286 | 2/1977 | Moll | 99/276 |

Primary Examiner—Robert W. Jenkins
Attorney, Agent, or Firm—Wood, Herron & Evans

[57] ABSTRACT

Brewing apparatus and a method of brewing in which mash cooking and wort boiling are carried out in a single vessel (2), the vessel having an agitator (202), a heater preferably formed as a steam jacket (220, 224) and as an external through flow heater (8), the wort being circulated through the heater and back into the vessel by means of a tangential feed inlet (56) which causes the vessel's contents to whirl while the wort is boiling. The apparatus and method reduces the requirement for separate mash cooking and wort boiling vessels.

15 Claims, 3 Drawing Figures

BREWING APPARATUS

The present invention relates to brewing apparatus and a method of brewing using such an apparatus.

Traditionally the process of mash cooking, wort boiling and whirlpool separation have been carried out in separate vessels. Recently we have successfully combined the wort boiling process and whirlpool separation in a single vessel, this has resulted in heat savings whilst there has been some saving in plant cost.

Brewing apparatus according to the present invention comprises an at least part cylindrical vessel, mash agitation means within the vessel, means for raising the temperature of the vessel contents, means for causing a rapid circulation of the contents of the vessel by whirling the contents.

A method of brewing according to the present invention comprises in a single vessel agitating mash whilst cooking the mash, boiling the wort, and circulating the wort through the vessel whilst boiling.

Preferably the apparatus also comprises a lauter tun into which the mash may be run off and from which wort is returned to the vessel.

The means for raising the temperature of the contents preferably comprises a steam jacket at least partially surrounding the vessel and an external through flow wort boiler, the wort boiler having a tangential input into a cylindrical side of the vessel.

Advantages of the invention over known apparatus and methods are reduction in construction costs, space utilization and heat losses, heat losses being quite considerable in known apparatus between individual vessels. Energy conservation is utilized to the maximum since the structural heat requirements of the vessel are combined plant utilization for prime movers, that is pumps, and ancillary equipment, that is valves, is maximised since components may be used for multiple functions.

An embodiment of the invention will now be described by way of example with reference to the accompanying drawings in which.

Figure 1:
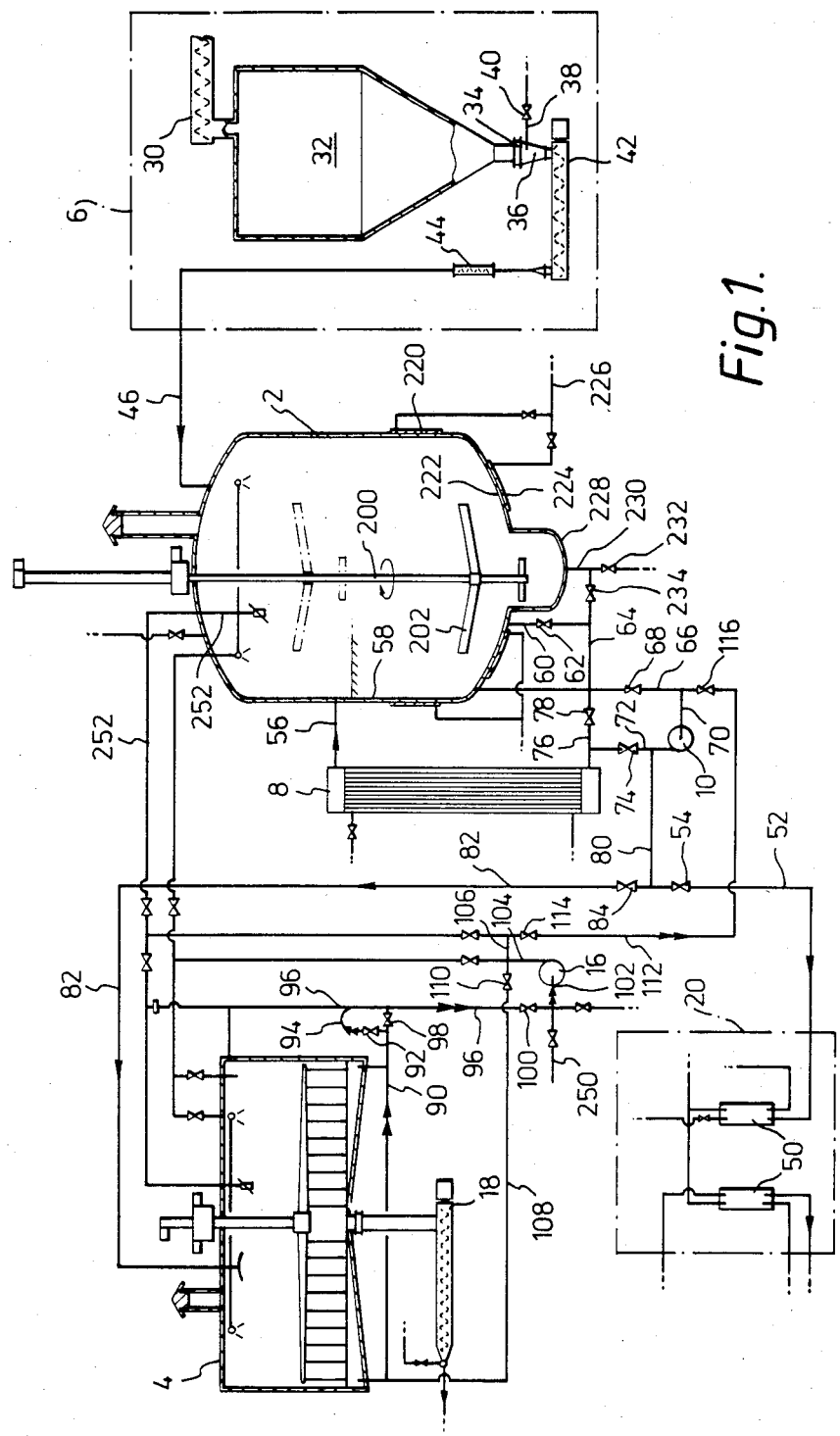
FIG. 1 is a flow diagram of the brewing apparatus according to the invention.

A brewing apparatus is shown generally in FIG. 1 which comprises two main vessels namely a combined mash mixer, kettle and whirlpool vessel 2 and a lauter tun 4. Associated with these vessels are grist feed means 6, a flow through wort boiler 8, a combined transfer and circulation pump 10 (shown as two separate pumps 12 and 14 in FIGS. 2 and 3), a wort run-off or transfer pump 16, a lauter tun spent grain removal device 18 and wort cooling means 20.

The lauter tun 4 with associated device 18 are conventional and need no further description.

Grist feed means 6 comprising a feed in device 30, a grist case 32, an outlet valve 34, a vortex feed unit 36 with mash liquor input line 38 controlled by valve 40, a mono pump 42 and a static in line mixer 44 feeds line 46 into the combined vessel 2. The liquor is normally fed from a separate guaged liquor tank where the liquor can be treated to 65°-75° C. The cooling means 20 comprising a two stage cooler 50 is fed from wort run-off line 52 controlled by valve 54.

The wort boiler 8 which may be either steam heated (suitable for larger installations e.g. 1000 barrel output) or gas fired for smaller installations e.g. 30 barrel output is coupled to the combined vessel 2 by a vessel input 56 which feeds tangentially into a cylindrical wall 58 of the vessel and is fed by vessel outlet line 60 having valve 62, common line 64, pump line 66 having valve 68, pump inlet line 70, pump 10, pump outlet line 72 having valve 74 and boiler inlet line 76. A bypass valve 78 separates lines 76 and 64. Line 80 joins line 82 having valve 84 for feeding mash from the vessel 2 to tun 4.

Wort is run-off from the lauter tun 4 through run-off line 90 through valve 92 in line 94, line 96 in which is valve 100. Lines 96 and 90 are connected also by bypass valve 98. Line 96 is connected to wort run-off pump inlet line. Wort run-off pump 16 then pumps through outlet line 104, line 106 (which is connected to underlet line 108 through underlet valve 110), wort run-off 112 in which are valves 114 and 116 and thence back through line 66 or 70 into vessel 2.

Within vessel 2 is an off-centrally mounted shaft 200 on which are mounted agitator blades 202 and trub sump blades 204. The off-centered mounting of the shaft improves agitation. Shaft 200 is arranged to be raised from the firm line position A shown in FIG. 2 either by attaching a tackle or chain hoist to eye 201 or when fully raised the blades 204 are at the broken line position B of FIG. 2. An external motor and gearing 206 is provided on the vessel top to drive shaft 200 to rotate the blades.

Around the cylindrical wall 58 at its lower part is a steam jacket 220 and on the outside of the dished bottom wall 222 is a second steam jacket 224. Jackets 220 and 224 are fed by a main steam line 226.

Trub sump 228 is fitted with a drain line 230 closed by valve 232 and isolation from line 64 by its valve 234.

A typical operating cycle using the above apparatus would be as follows:

Starting with a vessel 2 being clean, agitator blades 202 are at position A and running whilst malted grist and liquor (hot water) are pumped in through line 46. The hot water is normally at about 65°-75° C. and is a preset quantity gauged at a liquor tank (not shown).

When the charge of grist and water is complete in vessel 2, the charge is allowed to stand at 45° C. for 15 minutes.

With the agitator blades still running the charge, that is the mash, is raised to 65° C. in 20 minutes by means of jackets 220 and 224.

The mash is allowed to stand for 30 minutes.

With the agitator running the mash is then raised to 76° C. in 11 minutes by means of jackets 220, 224. On reaching 76° C. the mash is pumped by means of pump 10 or 12 to lauter tun 4. On emptying vessel 2, the vessel is flushed clean—suitable cleaning fluid can be pumped into the vessel 2 through lines 250 and 252 using pump 16.

Within 15 or 20 minutes wort run-off from the lauter tun 4 is commenced returning the wort back to vessel 2 by means of pump 16, this will continue for about 120 minutes.

When 50% of the wort volume is reached in vessel 2 the agitator blades 202 are raised from lower position A to the upper position B so that they disengage from the contents of the vessel.

Wort circulation is now commenced by running pump 10 or 14 and heat is applied to the wort by means of boiler 8 to commence pre-heating the wort from 76° C. to 100° C.

When the full wort volume is reached, the adjuncts e.g. sugar and hops are added and the whole volume is boiled for about 60 minutes whilst continuously circulating through the boiler 8.

On completion of the boiling phase, the heater and circulating pump 10 or 14 are isolated and the wort continues to rotate due to inertia for about 15 minutes.

The clarified wort is then transferred through the cooling means 20 to fermentation vessels (not shown).

The trub residue collected in the trub sump 228 is then discharged through drain valve 232 and the system flushed clean ready for the next batch of mash.

It will be appreciated that the cylindrical diameter D of vessel 2 is dimensioned so as to provide optimum flow characteristics when whirling the wort. Taking the effective bottom the vessel at a calculated point approximately where the dishing of the bottom wall 222 would indicate a reference point or bottom level R can be determined. The optimum wort level L is then at a height above R where $L/D = 0.6$ to $1.0$ In FIG. 2 vessel 2 is dimensioned so that $L'/D$ (34 barrel wort level) is about 0.65 and $L''/D$ (30 barrel wort level) is about 0.60. A lower level $L'''$ (for a half charge of 15 barrels) is such that $L'''/D$ is about 0.33. At this lower level of optimum wort level may not be achieved.

On initial trials L/D may preferably be about 0.73.

Figure 2:
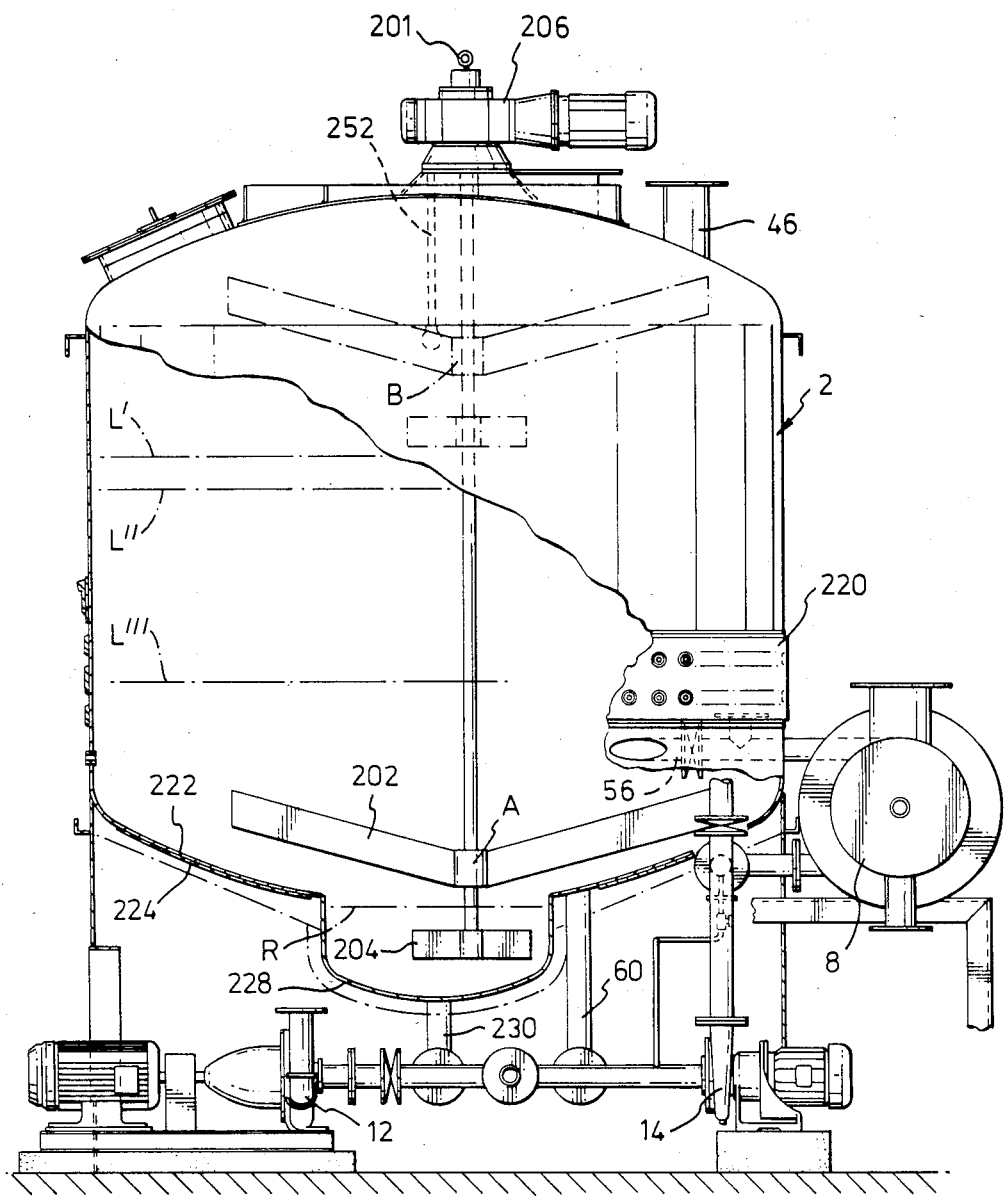
FIG. 2 is a side view in partial cross section of a combined mash mixer, kettle, whirlpool vessel for the apparatus of FIG. 1.
Figure 3:
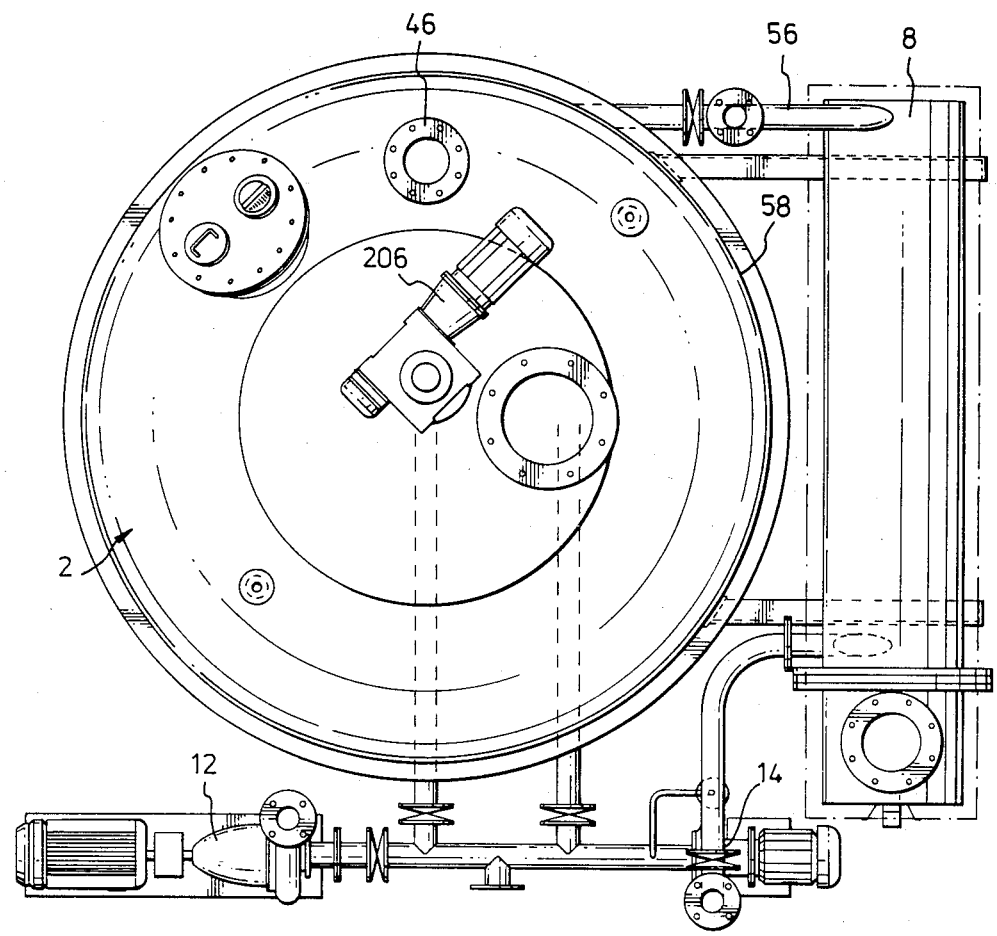
FIG. 3 is a plan view of the vessel of FIG. 2.

In the example given in FIG. 2 D is 2300 mm. The height of the whirlpool inlet above R is about 550 mm whilst L' is 1485 mm.

What is claimed is:

1. Brewing apparatus comprising
   an at least part cylindrical vessel,
   mash agitation means within said vessel,
   means for raising the temperature of the vessel contents comprising an external through flow wort boiler, and
   means for causing a rapid circulation of the contents of said vessel by whirling the contents, said circulation means comprising
   a tangential input located in a cylindrical side of said vessel, said wort boiler being connected to said tangential input, and
   a pump provided to pump the contents through said boiler and input.

2. Apparatus as claimed in claim 1 further comprising a lauter tun connected to an outlet of said vessel, the tun having an outlet connected to an inlet of the vessel whereby wort from the tun can be fed back into the vessel.

3. Apparatus as claimed in claim 1 wherein said means for raising the temperature of the vessel contents comprises a steam jacket at least partially surrounding said vessel, said jacket connected to a source of steam.

4. Apparatus as claimed in claim 1 wherein said mash agitation means comprises blade means having at least one blade mounted to a vertical shaft connected for rotating to a motor, said blade means being connectable with raising means to raise blade means from a lower position engageable with vessel contents to an upper position disengaged with said vessel contents.

5. Apparatus as claimed in claim 1 wherein said vessel is provided with an outwardly dished bottom having a sump formed therein.

6. Apparatus as claimed in claim 5 wherein said agitation means comprises blade means having at least one blade mounted to a vertical shaft the axis of which is offset to the axis of the vessel, the shaft being connected for rotating to a motor and wherein further blade means are provided at a lower extremity of said shaft, said further blade means being rotatable in an area surrounded by said sump.

7. Apparatus as claimed in claim 1 wherein said vessel is dimensioned so that its height without a sump is related to its diameter and so that H:D is about 1:1, a lowest point of said height defining a reference point R.

8. Apparatus as claimed in claim 7 wherein a tangential input is provided for said circulation means at an input level above point R where said input level relates to D as about 55 to 230 and to H as about 55 to 235.

9. Brewing apparatus comprising
   an at least part cylindrical vessel, said vessel having an outwardly dished bottom and a sump formed therein,
   mash agitation means within said vessel, said agitation means comprising
   blade means having at least one blade mounted to a vertical shaft, the axis of said shaft being offset relative to the axis of said vessel, said shaft being connected to a motor for rotating said shaft, and
   further blade means mounted to a lower extremity of said shaft, said further blade means being rotatable in an area surrounded by said sump,
   means for raising the temperature of the vessel contents, and
   means for causing a rapid circulation of the contents of said vessel by whirling the contents.

10. Apparatus as claimed in claim 9 further comprising
    a lauter tun connected to an outlet of said vessel, said tun having an outlet connected to an inlet of said vessel whereby wort from said tun can be fed back into said vessel.

11. Apparatus as claimed in claim 9 said means for raising the temperature of the vessel contents comprising
    a steam jacket at least partially surrounding said vessel, said jacket being connected to a source of steam.

12. Apparatus as claimed in claim 9, said means for raising the temperature of the vessel contents comprising
    an external through flow wort boiler, said wort boiler being connected to a tangential input into a cylindrical side of said vessel, and said circulation means comprising
    a pump provided to pump the contents through said boiler and input.

13. Apparatus as claimed in claim 9, said mash agitation means comprising
    raising means to raise said blade means from a lower position engageable with the vessel contents to an upper position disengaged from the vessel contents.

14. Apparatus as claimed in claim 9, said vessel being dimensioned so that its height without a sump is related to its diameter so that H:D is about 1:1, a lowest point of said height defining a reference point R.

15. Apparatus as claimed in claim 14, tangential input being provided for said circulation means at an input level about point R where the input level relates to D as about 55 to 230 and to H as about 55 to 235.

* * * * *